C. M. BRADFIELD.
TROLLEY WHEEL.
APPLICATION FILED MAR. 28, 1908.
907,726.
Patented Dec. 29, 1908.
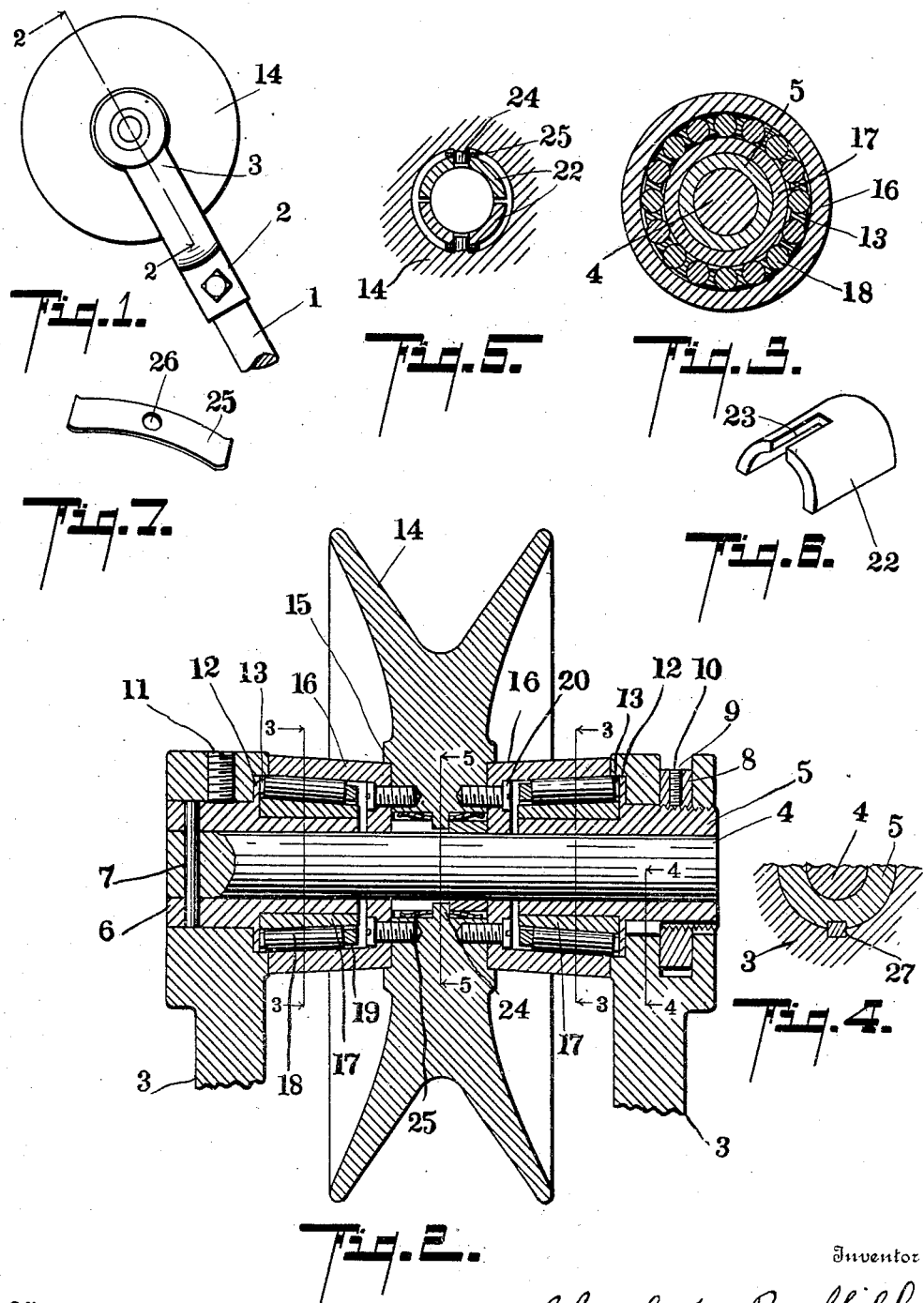

UNITED STATES PATENT OFFICE.

CLAUDE M. BRADFIELD, OF GRAND RAPIDS, MICHIGAN.

TROLLEY-WHEEL.

No. 907,726.   Specification of Letters Patent.   Patented Dec. 29, 1908.

Application filed March 28, 1908. Serial No. 423,924.

*To all whom it may concern:*

Be it known that I, CLAUDE M. BRADFIELD, a citizen of the United States, residing at Grand Rapids, Michigan, have invented certain new and useful Improvements in Trolley-Wheels, of which the following is a specification.

This invention relates to improvements in trolley wheels.

The main objects of this invention are: First, to provide an improved trolley wheel having roller bearings in which the current is effectively conducted from the wheel. Second, to provide an improved trolley wheel having roller bearings which may be quickly and easily adjusted to properly adjust the bearings. Third, to provide in a trolley wheel an improved bearing in which the wheel or any part of the bearing may be renewed, as may be desirable. Fourth, to provide an improved trolley wheel possessing these advantages in which the parts can be easily assembled or disassembled for convenience in manufacture and changing the parts as occasion requires.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which:

Figure 1 is a side elevation of a trolley wheel embodying the features of my invention. Fig. 2 is an enlarged detail section taken on a line corresponding to line 2—2 of Fig. 1. Fig. 3 is a cross section through the bearing taken on a line corresponding to the lines 3—3 of Fig. 2. Fig. 4 is a detail section taken on a line corresponding to line 4—4 of Fig. 2. Fig. 5 is a detail cross section taken on a line corresponding to line 5—5 of Fig. 2, showing details of the contact means. Fig. 6 is a perspective view of one of the contact bushing sections. Fig. 7 is a view of one of the contact springs.

Referring to the drawings, 1 represents a trolley pole; 2 a trolley harp having arms, as 3, 3. The spindle 4 is arranged through the arms and on the spindle is a pair of inner bearing members 5 and 6. The bearing member 6 is preferably secured to the spindle, as by means of the pin 7, while the bearing member 5 is adjustably mounted thereon. This adjustment I preferably accomplish by threading the outer end of the bearing member 5 and provide an adjusting nut, as 8, which is arranged in a slot 9 in one of the supporting arms. By the turning of the nut, it will be obvious that the bearing 5 is forced in or out to adjust the bearing. The bearing 5 is prevented from turning in the arm by means of the feather 27. A set screw, as 10, is provided for securing the adjusting nut 8 in its adjusted position. The bearing member 6 is secured in the other arm by suitable means, preferably a set screw, as 11. Each of the bearing members are preferably provided with outwardly-projecting flanges 12, which are adapted to fit into suitable seats 13, provided therefor in the inner faces of the supporting arms. The wheel 14 is preferably provided with seats 15 on its faces adapted to receive the inner ends of the outer bearing members 16. These outer bearing members are preferably conical; the inner bearing members being provided with conical bushings 17.

I preferably retain the bearing rollers 18 by means of cages 19. The outer bearing members 16 are preferably detachably secured to the wheel by means of suitable screws, as 20, so that they can be easily removed should it be desirable to renew one of the bearing members, or so that the wheel proper can be renewed when it becomes worn out in use. By thus arranging the parts, the bearing can be easily and effectively adjusted to take up the wear, as desired, and in assembling the parts.

I interpose a contact device between the spindle and the wheel, preferably consisting of a bushing made up of sections 22, the sections having longitudinal slots 23 therein. The wheel is provided with inwardly projecting pins or lugs 24 adapted to engage these slots so that the bushing is thereby connected to the wheel to revolve therewith. Between the bushing sections and the wheel, I arrange the contact springs 25. These are preferably in the form of blade springs, suitably conformed so that they bear on the wheel and bushing sections. The springs are preferably provided with perforations 26 through which the lugs 24 are arranged so that they are thereby held in place. By this means, I effectively conduct the current from the wheel, the contact device being entirely protected and cannot be injured from blows, or made useless by ice, water or the like. The bearings, having no functions to perform in the matter of conducting the current, may be kept suitably lubricated without interference with the conducting of the current. Further, roller bearings may be effectively used in this structure.

I have illustrated and described my improved trolley wheel in detail in the form preferred by me on account of its structural simplicity and adjustability and convenience with which the parts may be assembled or disassembled in manufacture and for renewing. I am aware, however, that the structure can be very considerably varied in structural details without departing from my invention, and I desire to be understood as claiming my invention specifically, as illustrated, as well as broadly.

Having thus described my invention, what I claim as new and desire to secure by Letters Patent is:

1. The combination with a harp, of a spindle; a pair of inner bearing members arranged in the arms of said harp, said bearing members having outwardly projecting flanges thereon and one of them being secured to and the other being adjustable upon said spindle; an adjusting nut on said adjustable bearing member arranged in a slot in the said harp arm; means for securing said nut in its adjusted position; means for securing the other inner bearing member in the other arm of the harp; a wheel having seats in its faces; a pair of conical outer bearing members or cones arranged in said seats and detachably secured to said wheel; bearing rollers; cages therefor; conical bushings for the said inner bearing members; and a contact device interposed between said wheel and spindle.

2. The combination with a harp, of a spindle; a pair of inner bearing members having outwardly-projecting flanges thereon and one of them being secured to and the other being adjustable upon said spindle; an adjusting nut on said adjustable bearing member arranged in a slot in the said harp arm; means for securing said nut in its adjusted position; means for securing the other inner bearing member in the other arm of the harp; a wheel having seats in its faces; a pair of conical outer bearing members or cones arranged in said seats and detachably secured to said wheel; bearing rollers; cages therefor; and conical bushings for the said inner bearing members.

3. The combination with a harp, of a spindle; a pair of inner bearing members arranged in the arms of said harp, one of said bearing members being secured to and the other being adjustable upon said spindle; an adjusting nut on said adjustable bearing member arranged in a slot in the said harp arms; a wheel; a pair of conical outer bearing members or cones; conical bushing for the said inner bearing members; and a contact device interposed between said wheel and spindle.

4. The combination with a harp, of a spindle; a pair of inner bearing members arranged in the arms of said harp, one of said bearing members being secured to and the other being adjustable upon said spindle; an adjusting nut on said adjustable bearing member arranged in a slot in the said harp arm; a wheel; a pair of conical outer bearing members or cones; and conical bushing for the said inner bearing members.

5. The combination with a harp, of a spindle; a pair of inner bearing members arranged in the arms of said harp, one of said bearing members being secured to and the other being adjustable upon said spindle; an adjusting nut on said adjustable bearing member arranged in a slot in the said harp arm; a wheel; a pair of outer bearing members; and a contact device interposed between said wheel and spindle.

6. The combination with a harp, of a spindle; a pair of inner bearing members arranged in the arms of said harp, one of said bearing members being secured to and the other being adjustable upon said spindle; an adjusting nut on said adjustable bearing member arranged in a slot in the said harp arm; a wheel; and a pair of outer bearing members or cones.

7. The combination with a harp, of a spindle; a pair of inner bearing members arranged on said spindle, one of said bearing members being secured to and the other being adjustable upon said spindle; a wheel, a pair of outer bearing members, detachably secured to said wheel; and a contact device interposed between said wheel and spindle between the said bearings thereof.

8. The combination with a harp, of a spindle; a pair of inner bearing members arranged on said spindle, one of said bearing members being secured to and the other being adjustable upon said spindle; a wheel; a pair of outer bearing members; and a contact device interposed between said wheel and spindle between the said bearings thereof.

9. In a harp, the combination with a spindle; a pair of inner bearing members arranged on said spindle; a wheel; bearing members detachably secured thereto adapted to co-act with said bearing members on said spindle; means for adjusting said bearing members; a sectional bushing arranged in said wheel adapted to bear on said spindle, the sections of said bushings having longitudinal slots therein; inwardly projecting lugs on said wheel adapted to engage said slots; and springs interposed between said bushing sections and said wheel, said springs being perforated to receive the said inwardly projecting lugs of said wheel, whereby they are held in position.

10. In a harp, the combination with a spindle; a pair of inner bearing members arranged on said spindle; a wheel; bearing members secured thereto adapted to co-act with said bearing members on said spindle; means for adjusting said inner bearing members; a sectional bushing arranged in said wheel adapted to bear on said spindle, the sections of said bushings having longitudinal slots therein; inwardly projecting lugs on said wheel adapted to engage said slots; and springs interposed between said bushing sections and said wheel, said springs being perforated to receive the said inwardly projecting lugs of said wheel, whereby they are held in position.

11. In a harp, the combination with a spindle; a pair of inner bearing members arranged on said spindle; a wheel; bearing members detachably secured thereto adapted to co-act with said bearing members on said spindle; a sectional bushing arranged in said wheel adapted to bear on said spindle, the sections of said bushings having longitudinal slots therein; inwardly projecting lugs on said wheel adapted to engage said slots; and springs interposed between said bushing sections and said wheel, said springs being perforated to receive the said inwardly projecting lugs of said wheel, whereby they are held in position.

12. In a harp, the combination with a spindle; a pair of inner bearing members arranged on said spindle; a wheel; bearing members secured thereto adapted to co-act with said bearing members on said spindle; a sectional bushing arranged in said wheel adapted to bear on said spindle, the sections of said bushings having longitudinal slots therein; inwardly projecting lugs on said wheel adapted to engage said slots; and springs interposed between said bushing sections and said wheel, said springs being perforated to receive the said inwardly projecting lugs of said wheel, whereby they are held in position.

13. In a harp, the combination with a spindle; a pair of inner bearing members arranged on said spindle; a wheel; bearing members detachably secured thereto adapted to co-act with said bearing members on said spindle; means for adjusting said inner bearing members; a bushing arranged in said wheel adapted to bear on said spindle; and a contact spring interposed between said bushing section and said wheel.

14. In a harp, the combination with a spindle; a pair of inner bearing members arranged on said spindle; a wheel; bearing members secured thereto adapted to co-act with said bearing members on said spindle; means for adjusting said inner bearing members; a bushing arranged in said wheel adapted to bear on said spindle; and a contact spring interposed between said bushing section and said wheel.

15. In a harp, the combination with a spindle; a pair of inner bearing members arranged on said spindle; a wheel; bearing members detachably secured thereto adapted to co-act with said bearing members on said spindle; a bushing arranged in said wheel adapted to bear on said spindle; and a contact spring interposed between said bushing section and said wheel.

16. In a harp, the combination with a spindle; a pair of inner bearing members arranged on said spindle; a wheel; bearing members secured thereto adapted to co-act with said bearing members on said spindle; a bushing arranged in said wheel adapted to bear on said spindle; and a contact spring interposed between said bushing section and said wheel.

In witness whereof, I have hereunto set my hand and seal in the presence of two witnesses.

CLAUDE M. BRADFIELD. [L. S.]

Witnesses:
   L. G. GREENFIELD,
   GERTRUDE TALLMAN.